US012680881B2

(12) United States Patent
Oulachgar et al.

(10) Patent No.: US 12,680,881 B2
(45) Date of Patent: Jul. 14, 2026

(54) MICROBOLOMETER DETECTORS WITH OPTICAL ABSORBER STRUCTURES FOR DETECTION OF TERAHERTZ RADIATION

(71) Applicant: Technologies Luqia, Québec (CA)

(72) Inventors: Hassane Oulachgar, Québec (CA); Christine Alain, Québec (CA); Francis Genereux, Québec (CA)

(73) Assignee: Technologies Luqia, Quebec (CA)

( * ) Notice: Subject to any disclaimer, the term of this patent is extended or adjusted under 35 U.S.C. 154(b) by 88 days.

(21) Appl. No.: 18/689,981

(22) PCT Filed: Sep. 14, 2021

(86) PCT No.: PCT/CA2021/051276
§ 371 (c)(1),
(2) Date: Mar. 7, 2024

(87) PCT Pub. No.: WO2023/039657
PCT Pub. Date: Mar. 23, 2023

(65) Prior Publication Data
US 2024/0288310 A1 Aug. 29, 2024

(51) Int. Cl.
*G01J 5/20* (2006.01)
*G01J 5/08* (2022.01)
(Continued)

(52) U.S. Cl.
CPC .............. *G01J 5/20* (2013.01); *G01J 5/0802* (2022.01); *G01J 5/0884* (2013.01); *G01J 2005/0077* (2013.01); *G01J 2005/204* (2013.01)

(58) Field of Classification Search
CPC .......... G01J 5/20; G01J 5/0802; G01J 5/0884; G01J 2005/0077; G01J 2005/204;
(Continued)

(56) References Cited

U.S. PATENT DOCUMENTS 9,261,411 B2 2/2016 Oulachgar et al.
9,476,774 B2 10/2016 Oulachgar et al.
(Continued)

FOREIGN PATENT DOCUMENTS

EP 3370048 A1 9/2018
JP 2002296117 A 10/2002

OTHER PUBLICATIONS

Supplementary European Search Report mailed May 19, 2025, for European Pat. App. No. 21956979.5 (28 pages).
(Continued)

*Primary Examiner* — Kiho Kim
(74) *Attorney, Agent, or Firm* — KDW Firm PLLC

(57) ABSTRACT

A microbolometer pixel unit for detection of terahertz radiation includes a substrate, a thermistor structure, and an optical absorber structure. The thermistor structure includes a plurality of microbolometer pixels disposed on the substrate. Each pixel includes a thermistor platform suspended above the substrate, a thermistor support member holding the thermistor platform, and a thermistor disposed on the thermistor platform and having an electrical resistance that varies in accordance with a temperature of the thermistor. The optical absorber structure includes an absorber platform suspended above the thermistor structure, an absorber support member holding the absorber platform and including a plurality of support elements, each support element providing a thermal conduction path from the absorber platform to the thermistor platform of a respective one of the microbolometer pixels, and an optical absorber disposed on the absorber platform to absorb incoming terahertz radiation to generate heat to change the temperature of the thermistors.

19 Claims, 15 Drawing Sheets

(51) Int. Cl.
G01J 5/0802 (2022.01)
*G01J 5/00* (2022.01)

(58) Field of Classification Search
CPC .... G01J 2005/202; G01J 5/024; G01J 5/0837;
G01J 5/0853
See application file for complete search history.

(56) References Cited

U.S. PATENT DOCUMENTS

| | | |
|---|---|---|
| 11,054,311 B1 | 7/2021 | Oulachgar et al. |
| 2011/0198720 A1* | 8/2011 | Tohyama .................. G01J 5/20 |
| | | 257/467 |
| 2014/0166882 A1 | 6/2014 | Oulachgar et al. |
| 2016/0178444 A1 | 6/2016 | Oulachgar et al. |

OTHER PUBLICATIONS

The International Search Report and Written Opinion mailed May 18, 2022 in corresponding PCT/CA2021/051276 (nine (9) pages).

* cited by examiner

MICROBOLOMETER DETECTORS WITH OPTICAL ABSORBER STRUCTURES FOR DETECTION OF TERAHERTZ RADIATION

RELATED APPLICATIONS

This application is a national phase filing under 35 U.S.C. § 371 claiming the benefit of and priority to International Patent Application No. PCT/CA2021/051276, filed 14 Sep. 2021, entitled "MICROBOLOMETER DETECTORS WITH OPTICAL ABSORBER STRUCTURES FOR DETECTION OF TERAHERTZ RADIATION", the contents of which are incorporated herein in its entirety.

TECHNICAL FIELD

The technical field generally relates to thermal radiation detectors and, more particularly, to microbolometer detectors with optical absorber structures configured for detection of terahertz (THz) radiation.

BACKGROUND

Thermal detectors are devices that absorb energy from incident electromagnetic radiation and convert the absorption-generated heat into an electrical signal indicative of the amount of absorbed radiation. Perhaps the most prominent thermal detectors currently available are uncooled microbolometer detectors or, simply, microbolometers. A microbolometer typically includes a platform or bridge structure having a low thermal mass, which is suspended above and thermally insulated from a substrate by a support member (e.g., including posts and arms). The platform is provided with a thermistor, which is a resistive element whose electrical resistance changes in response to temperature variations caused by the absorbed radiation. The thermistor may be composed of a material having a high temperature coefficient of resistance (TCR). Examples of such a material are vanadium oxide and amorphous silicon. Microbolometer detectors also generally include optical absorbers to enhance their sensitivity and overall performance. Microbolometer arrays can be fabricated on a substrate using common integrated-circuit-based microfabrication techniques, such as photolithography and surface or bulk micromachining. Detector components may be successively deposited and patterned using thin-film deposition techniques paired with selective photoresist and sacrificial etching processes. The substrate may be pre-manufactured with a readout integrated circuit (ROIC) using complementary metal-oxide-semiconductor (CMOS) processes. Because they do not require cryogenic cooling, uncooled microbolometers can operate at room temperature in various commercial, industrial, and military applications. Traditionally, uncooled microbolometers have been used to sense radiation in the infrared region of the electromagnetic spectrum, usually in the mid-wave infrared, encompassing wavelengths ranging from about 3 to about 5 micrometers (μm), or in the long-wave infrared, encompassing wavelengths ranging from about 8 to about 15 μm. More recently, research and development work has been carried out to extend the spectral response of uncooled microbolometers beyond the infrared range, notably in the far-infrared and terahertz spectral regions.

SUMMARY

The present description generally relates to microbolometer detectors with multi-pixel optical absorber structures configured for detection of terahertz radiation.

In accordance with an aspect, there is provided a microbolometer pixel unit for detection of terahertz radiation, including:

a substrate;

a thermistor structure including a plurality of microbolometer pixels disposed on the substrate, each microbolometer pixel including:

a thermistor platform suspended above the substrate;

a thermistor support member holding the thermistor platform; and a thermistor disposed on the thermistor platform and having an electrical resistance that varies in accordance with a temperature of the thermistor; and an optical absorber structure including:

an absorber platform suspended above the thermistor structure;

an absorber support member holding the absorber platform and including a plurality of support elements, each support element providing a thermal conduction path extending from the thermistor platform of a respective one of the microbolometer pixels to the absorber platform; and an optical absorber disposed on the absorber platform and configured to absorb incoming terahertz radiation to generate heat to change the temperature of the thermistors of the microbolometer pixels.

In some embodiments, the plurality of microbolometer pixels is arranged in an M×N array under the optical absorber structure, wherein M and N each range from 2 to 32.

In some embodiments, the thermistor platform of each microbolometer pixel has horizontal dimensions ranging from about 10 μm to about 50 μm.

In some embodiments, the absorber platform has horizontal dimensions ranging from about 20 μm to about 320 μm.

In some embodiments, the absorber platform has a square shape.

In some embodiments, the thermistor of each microbolometer pixel is made of a thermistor material including vanadium oxide or amorphous silicon.

In some embodiments, each support element of the absorber support member is coupled to a central region of the thermistor platform of the respective one of the microbolometer pixels.

In some embodiments, each support element of the absorber support member has a thermal conductance that is larger than a thermal conductance of the thermistor support member of the respective one of the microbolometer pixels.

In some embodiments, the optical absorber is configured to absorb the incoming terahertz radiation in a waveband ranging from about 30 micrometers to about 3000 micrometers.

In some embodiments, the optical absorber includes an electrically conductive layer patterned on the absorber platform to form an arrangement of a plurality of absorber elements.

In some embodiments, the optical absorber is configured to absorb a first component of the incoming terahertz radiation having a first polarization state more strongly than a second component of the incoming terahertz radiation having a second polarization state orthogonal to the first polarization state.

In some embodiments, the microbolometer pixel unit further includes a reflector disposed on the substrate and configured to form an optical resonant cavity with the optical absorber for enhancing absorption of the incoming terahertz radiation by the optical absorber.

In some embodiments, the microbolometer pixel unit further includes a radiation conditioner unit including:

a conditioner platform suspended above the optical absorber structure a conditioner support member holding the conditioner platform; and a radiation conditioner disposed on the conditioner platform and configured to spectrally condition the incoming terahertz radiation.

In some embodiments, the radiation conditioner includes an additional optical absorber configured to supplement the optical absorber disposed on the absorber platform.

In some embodiments, the optical absorber and the additional optical absorber are configured to have different sensitivities to a state of polarization of the incoming terahertz radiation.

In some embodiments, the radiation conditioner includes a spectral filter configured to filter out unwanted spectral components from the incoming terahertz radiation.

In some embodiments, the spectral filter is a low-pass filter.

In accordance with another aspect, there is provided a microbolometer array including a plurality of microbolometer pixel units such as disclosed herein.

In some embodiments, a number of the microbolometer pixel units ranges from about 64×48 to about 1024×768.

Other features and advantages of the present description will become more apparent upon reading of the following non-restrictive description of specific embodiments thereof, given by way of example only with reference to the appended drawings. Although specific features described in the above summary and the foregoing detailed description may be described with respect to specific embodiments or aspects, it should be noted that these specific features can be combined with one another, unless stated otherwise.

DETAILED DESCRIPTION

Figure 1:
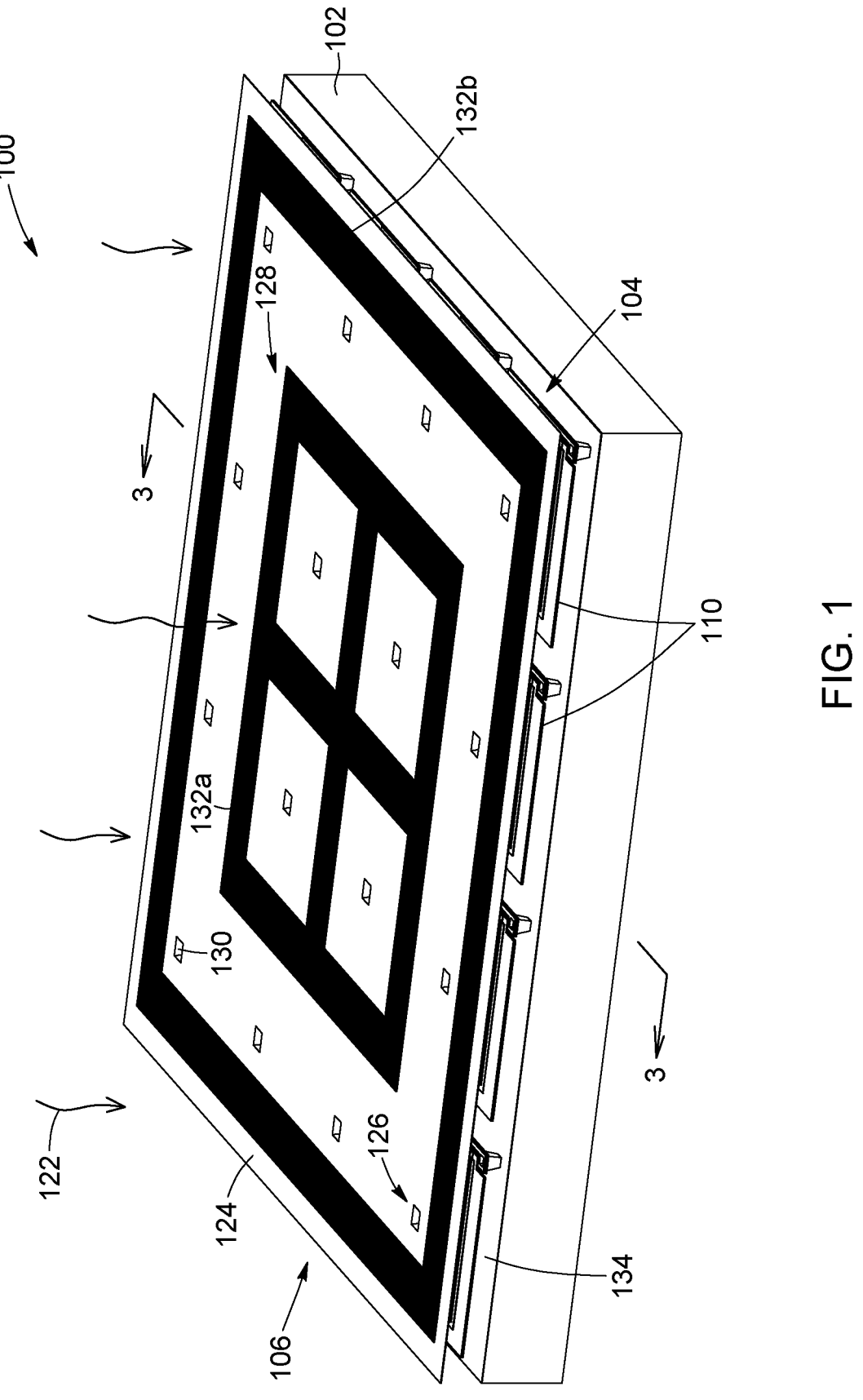
FIG. 1 is a schematic perspective view of a microbolometer pixel unit, in accordance with an embodiment.
Figure 2:
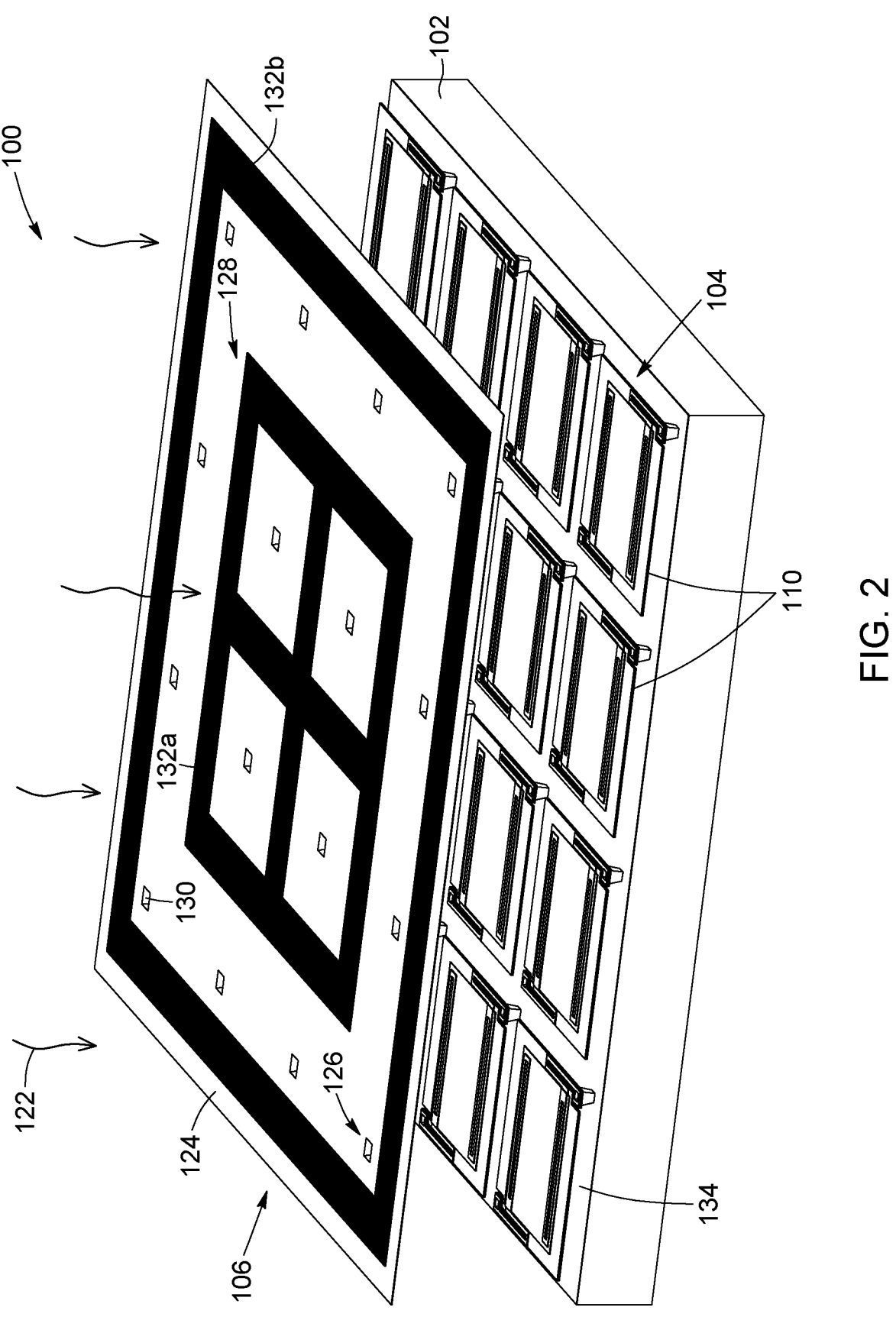
FIG. 2 is a partially exploded view of the microbolometer pixel unit of FIG. 1.
Figure 3:
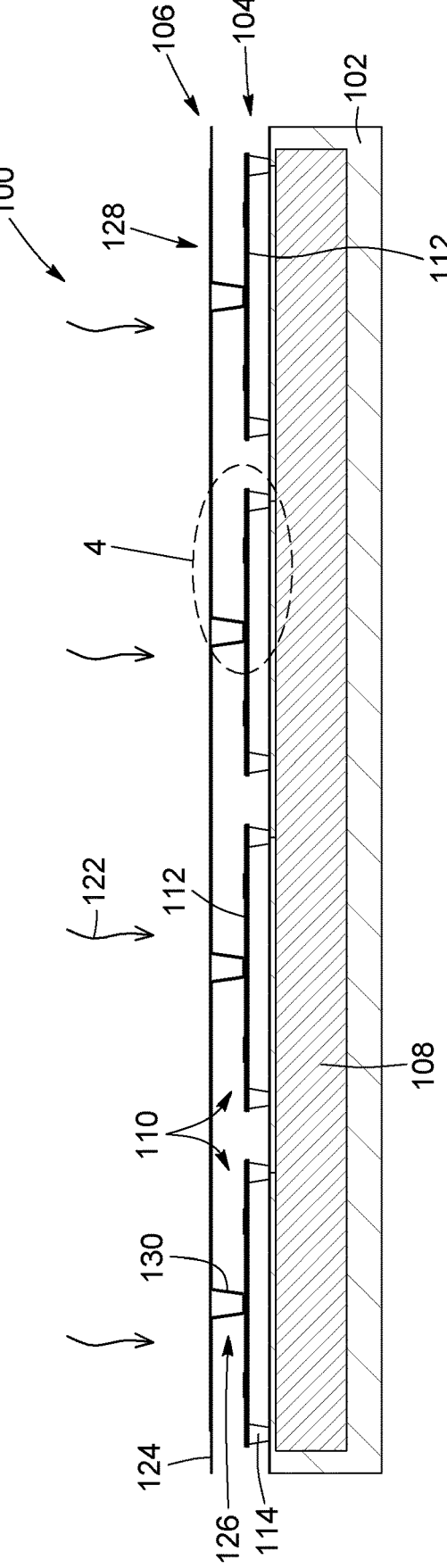
FIG. 3 is a cross-sectional view of the microbolometer pixel unit of FIG. 1, taken along section line 3-3.
Figure 4:
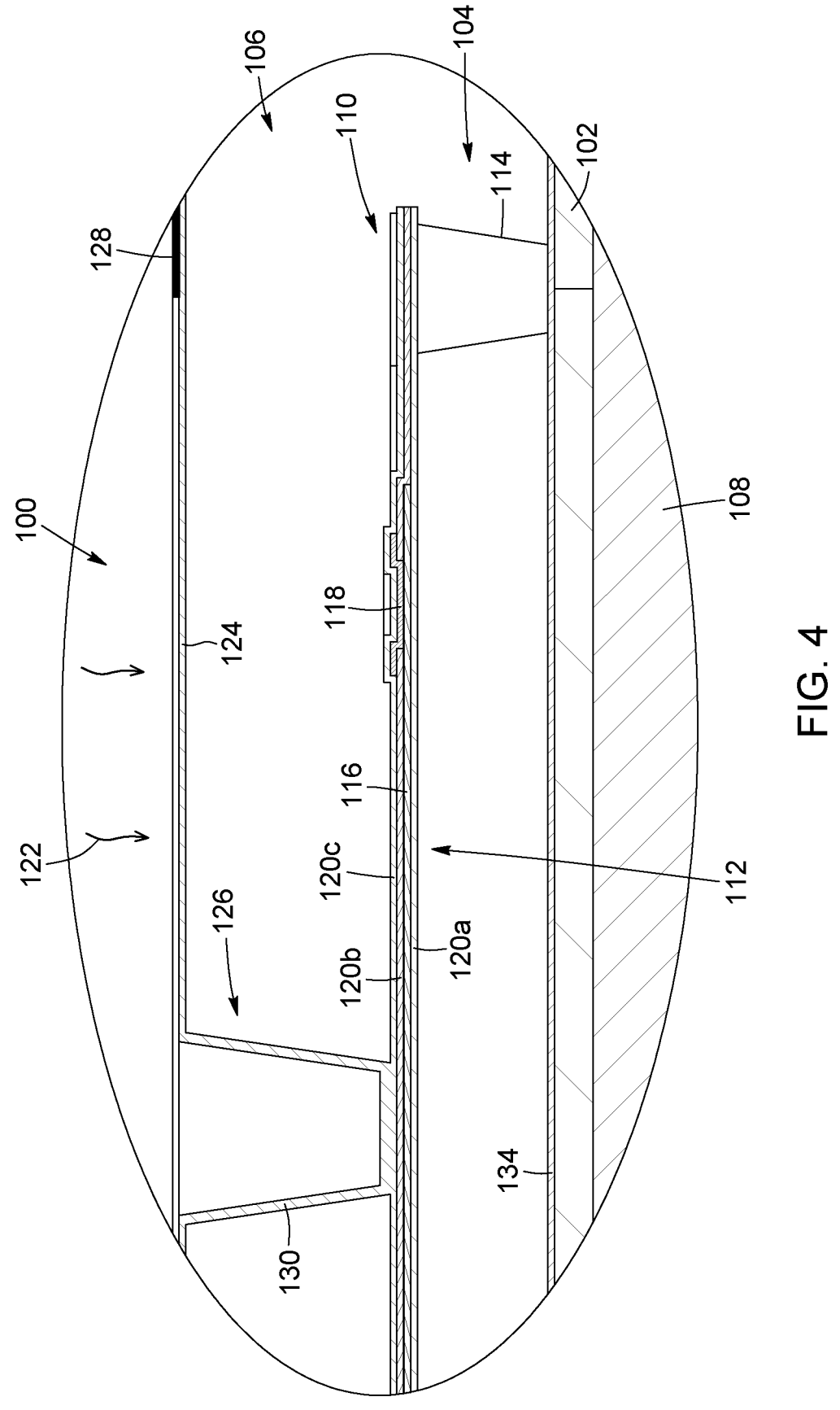
FIG. 4 is an enlarged view of portion 4 of FIG. 3.

In the present description, similar features in the drawings have been given similar reference numerals. To avoid cluttering certain figures, some elements may not be indicated if they were already identified in a preceding figure. The elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. Such spatially relative terms are intended to encompass different orientations in the use or operation of the present embodiments, in addition to the orientations exemplified in the figures. Furthermore, when a first element is referred to as being "on", "above", "below", "over", or "under" a second element, the first element can be either directly or indirectly on, above, below, over, or under the second element, respectively, such that one or multiple intervening elements may be disposed between the first element and the second element.

The terms "a", "an", and "one" are defined herein to mean "at least one", that is, these terms do not exclude a plural number of elements, unless stated otherwise.

The term "or" is defined herein to mean "and/or", unless stated otherwise.

Terms such as "substantially", "generally", and "about", which modify a value, condition, or characteristic of a feature of an exemplary embodiment, should be understood to mean that the value, condition, or characteristic is defined within tolerances that are acceptable for the proper operation of this exemplary embodiment for its intended application or that fall within an acceptable range of experimental error. In particular, the term "about" generally refers to a range of numbers that one skilled in the art would consider equivalent to the stated value (e.g., having the same or equivalent function or result). In some instances, the term "about" means a variation of +10% of the stated value. It is noted that all numerical values used herein are assumed to be modified by the term "about", unless stated otherwise.

The terms "connected" and "coupled", and derivatives and variants thereof, are intended to refer herein to any connection or coupling, either direct or indirect, between two or more elements, unless stated otherwise. For example, the connection or coupling between the elements may be mechanical, optical, electrical, magnetic, thermal, chemical, logical, fluidic, operational, or any combination thereof.

The present description generally relates to microbolometer detectors and arrays with optical absorber structures configured for detection of terahertz radiation.

The term "microbolometer" is intended to refer herein to a thermal radiation detector that includes a thermistor and that operates by absorption of a part of the electromagnetic radiation, converting the absorbed radiation into heat, and sensing the resulting temperature increase of the detector through a change of the electrical resistance of the thermistor. Microbolometers can be classified as either cooled or uncooled, depending on whether their operation involves cooling or not. It is appreciated that the theory, structure, operation, and applications of microbolometer detectors are generally known in the art, and need not be described in detail herein other than to facilitate an understanding of the present techniques. It is also appreciated that, in the present description, the terms "microbolometer" and "bolometer" can generally be used interchangeably.

The terms "light" and "optical", and variants and derivatives thereof, are intended to refer herein to radiation in any appropriate region of the electromagnetic spectrum. These terms are not limited to visible light, but may also include, without being limited to, the infrared, terahertz, and millimeter wave regions. The term "terahertz radiation" refers herein to electromagnetic radiation having a center wavelength ranging from about 30 μm to about 3000 μm, corresponding to frequencies ranging from about 0.1 THz to about 10 THz. However, the definition of the term "terahertz radiation" in terms of a particular spectral range may vary depending on the technical field or standard under consideration and is not meant to limit the scope of application of the present techniques.

The term "optical absorber" refers herein to a material or structure which, upon exposure to electromagnetic radiation within a certain waveband or a set of wavebands, absorbs electromagnetic energy from the electromagnetic radiation within that waveband or that set of wavebands and converts the absorbed electromagnetic energy into thermal energy.

As described in greater detail below, some embodiments disclosed herein relate to a microbolometer pixel unit for detection of terahertz radiation. The microbolometer pixel unit can include a substrate, a thermistor structure including a plurality of individual microbolometer pixels disposed on the substrate, and an optical absorber structure disposed over the plurality of microbolometer pixels of the thermistor structure. The optical absorber structure is physically connected to each microbolometer pixel to provide a thermal conduction path for the heat generated by terahertz radiation absorbed by the optical absorber structure to reach and heat up each microbolometer pixel so as produce an electrical signal indicative of the amount of absorbed radiation. Some embodiments disclosed herein also relate to an array of such microbolometer pixel units. In such embodiments, the spectral response of each microbolometer pixel unit can be individually tailored, for example, in terms of its spectral position, spectral profile (e.g., broadband or narrowband profile), and polarization sensitivity or insensitivity, to control the overall absorption characteristics of the array.

The present techniques have potential use in various commercial, industrial, and military applications that may benefit from or require microbolometer detectors with optical absorber structures configured for detection of terahertz radiation. Non-limiting examples of possible fields of use include, to name a few, defense and security, aerospace and astronomy, inspection and maintenance, night vision, transportation, pollution and fire detection, spectroscopy, remote sensing, industrial control, robotics, medicine, sports and entertainment, food supply chain management, and the Internet of Things. In some embodiments, the present techniques enable the development of microbolometer focal plane arrays configured to have broadband or frequency selective responses over a wide range of terahertz frequencies, which can be fabricated using integrated-circuit-based microfabrication techniques commonly used in the manufacturing of conventional infrared microbolometer focal plane arrays.

Various aspects, features, and implementations of the present techniques are described below with reference to the figures.

Referring to FIGS. 1 to 4, there are illustrated schematic views of a possible embodiment of a microbolometer pixel unit 100. The microbolometer pixel unit 100 may be used as one of multiple pixel units (e.g., up to hundreds or thousands of pixel units) of a microbolometer array of an uncooled microbolometer camera or another type of imaging device.

The microbolometer pixel unit 100 of FIGS. 1 to 4 generally includes a substrate 102, a thermistor structure 104, and an optical absorber structure 106. The structure, composition, and operation of these and other possible components of the microbolometer pixel unit 100 are described in greater detail below.

The microbolometer pixel unit 100 may be fabricated using common integrated-circuit and microfabrication techniques, such as surface and bulk micromachining. In such techniques, components of the microbolometer pixel unit 100 can be successively deposited and patterned on a substrate using thin-film deposition techniques combined with selective photoresist and sacrificial layer etching processes. In some applications, the microbolometer pixel unit 100 can be fabricated using a monolithic integration approach in which the substrate 102, typically provided with an underlying readout integrated circuit (ROIC), is pre-manufactured using CMOS processes. However, various other fabrication techniques may be used in other embodiments.

The substrate 102 provides mechanical support for the other components of the microbolometer pixel unit 100. The substrate 102 may be made of silicon (Si), silicon carbide (SIC), gallium arsenide (GaAs), gallium nitride (GaN), germanium (Ge), or of any other suitable material or combination of materials. For example, the substrate 102 may be a die separated from a semiconductor wafer, for example, a silicon wafer. The microbolometer pixel unit 100 may include an electrical readout circuit 108, which may be embodied by one or more CMOS circuitry layers formed in or on the substrate 102. Alternatively, the electrical readout circuit 108 may be provided outside of the substrate 102.

The thermistor structure 104 includes a plurality of individual microbolometer pixels 110 disposed on the substrate 102. It is appreciated that while the thermistor structure 104 of the microbolometer pixel unit 100 depicted in FIGS. 1 to 4 includes sixteen microbolometer pixels 110 disposed in a 4×4 array, the number and arrangement of the microbolometer pixels 110 can be varied in other embodiments. For example, in some embodiments, the thermistor structure 104 can include an array of M×N microbolometer pixels 110, where M and N each can range from 2 to 32. In some embodiments, the pixel pitch, that is, the center-to-center distance between nearest-neighbor ones of the microbolometer pixels 110, can range from about 10 μm to about 50 μm. It is also appreciated that while the microbolometer pixels 110 in FIGS. 1 to 4 are arranged in a square array, non-square arrays (including M×1 or 1×N linear arrays) as well as non-arrayed configurations are possible in other embodiments.

Referring still to FIGS. 1 to 4, each microbolometer pixel 110 generally includes a thermistor platform 112, a thermistor support member 114 suspending the thermistor platform 112 above the substrate 102, a thermistor 116 disposed on the thermistor platform 112 and having an electrical resistance that varies in accordance with a temperature of the thermistor 116, and an electrode structure 118 electrically connecting the thermistor 116 to the electrical readout circuit 108. It is appreciated that while the different microbolometer pixels 110 of the thermistor structure 104 may include similar components, any pair of microbolometer pixels 110 may be identical to or different from each other.

The term "platform" generally refers herein to a substantially planar, suspended structure, typically having greater horizontal dimensions than vertical thickness. In the present description, the term "horizontal" refers to directions lying in a plane generally parallel to the substrate 102, while the term "vertical" refers to a direction generally perpendicular to the plane of the substrate 102. For each microbolometer pixel 110, the suspension of the thermistor platform 112 above the substrate 102 provides thermal isolation to the thermistor 116, in order to enhance the detection sensitivity of the microbolometer pixel 110. The thermistor platform 112 may be a single or multilayer structure made of a low-stress and self-supporting material, such as silicon nitride, silicon dioxide, silicon oxynitride, or other suitable dielectric materials. For example, in the illustrated embodiment, the thermistor platform 112 includes three platform layers 120a, 120b, 120c. The thermistor platform 112 may have horizontal dimensions ranging from about 10 μm to about 50 μm, although other platform dimensions may be used in other embodiments. It is appreciated that the thermistor platform 112 may be provided in a variety of sizes, shapes, and configurations.

The thermistor support member 114 is configured to hold the thermistor platform 112 in a spaced-apart relationship above the substrate 102, for example, at a height ranging from about 0.5 μm to about 5 μm, although other height values are possible in other embodiments. In some embodiments, the thermistor support member 114 may be configured to hold the thermistor platform 112 at locations closer to its center, at locations closer to its periphery, or both. The thermistor support member 114 also provides a path for the electrode structure 118 to connect the thermistor 116 to the electrical readout circuit 108. The thermistor support member 114 may be made of a low-stress and self-supporting material, such as silicon nitride, silicon dioxide, silicon oxynitride, or other suitable dielectric materials. The thermistor support member 114 may have a variety of configurations to meet the mechanical, electrical, and/or thermal requirements or preferences of a given application.

Referring still to FIGS. 1 to 4, the thermistor 116 has an electrical resistance responsive to variations in its temperature resulting from the heat generated by the absorption of terahertz radiation 122 by the optical absorber structure 106. In the present description, the term "thermistor" is intended to encompass any suitable material, structure, or device having an electrical resistance that changes as a function of its temperature, generally in a predictable and controllable manner. The thermistor 116 may be made of a material having a high temperature coefficient of resistance (TCR) at room temperature, for example, at least 0.5% per kelvin in magnitude. Non-limiting examples of thermistor materials include, to name a few, vanadium oxide, amorphous silicon, and titanium oxide. However, other thermistor materials or combinations of thermistor materials may be used in other embodiments, such as semiconductor-based, ceramic-based, polymer-based, and metal-based thermistors, with either positive or negative TCRs. Although each microbolometer pixel 110 includes a single thermistor 116 in the embodiment of FIGS. 1 to 4, configurations in which one or more of the microbolometer pixels include a plurality of thermistors are possible in other embodiments. It is appreciated that the size, shape, composition, and arrangement of each thermistor 116 may be varied in accordance with a given application.

The electrode structure 118 extends along the thermistor platform 112, the thermistor support member 114 and the substrate 102 to provide an electrically conductive path between the thermistor 116 and the electrical readout circuit 108. The electrode structure 118 may be made of any suitable electrically conducting material including, to name a few, gold, aluminum, titanium, copper, silver, tungsten, chrome, and vanadium. The size, shape, composition, and arrangement of the electrode structure 118 may be varied in accordance with a given application.

The electrical readout circuit 108 is configured to measure, via the electrode structure 118, the changes in the electrical resistance of the thermistor 116. The electrical readout circuit 108 is also configured to provide an electrical output signal (e.g., a voltage and/or a current) whose amplitude is representative of the measured resistance variations. The electrical readout circuit 108 may include a number of passive and/or active components (e.g., analog-to-digital converters, buffers, integrators, timing components) and may be implemented using a variety of circuit architectures and designs.

Referring still to FIGS. 1 to 4, the optical absorber structure 106 includes an absorber platform 124, an absorber support member 126 suspending the absorber platform 124 above the thermistor structure 104, and an optical absorber 128 disposed on the absorber platform 124 and configured to absorb the incoming terahertz radiation 122 to generate heat and change the temperature of the thermistors 116 of the underlying microbolometer pixels 110.

The absorber platform 124 may be a single or multilayer structure made of a low-stress and self-supporting material, such as silicon nitride, silicon dioxide, silicon oxynitride, or other suitable dielectric materials. The absorber platform 124 may have horizontal dimensions ranging from about 20 μm to about 312 μm, and a thickness ranging from about 0.1 μm to about 0.5 μm, although other platform dimensions may be used in other embodiments. The absorber platform 124 may be provided in a variety of sizes, shapes, and configurations. For example, while the absorber platform 124 in FIGS. 1 to 4 has a square shape, other platform shapes, for example, rectangular, hexagonal, and circular, may be used in other embodiments.

The absorber support member 126 may be made of a low-stress and self-supporting material, such as silicon nitride, silicon dioxide, silicon oxynitride, or other suitable dielectric materials. The absorber support member 126 may have a variety of configurations to meet the mechanical, electrical, and/or thermal requirements or preferences of a given application. In some embodiments, the absorber support member 126 may be configured to hold the absorber platform 124 at a height ranging from about 1 μm to about 50 μm above the thermistor platforms 112 of the underlying microbolometer pixels 110, although other height values are possible in other embodiments.

The absorber support member 126 can include a plurality of support elements 130. Each support element 130 provides a thermal conduction path that extends from the thermistor platform 112 of a respective one of the microbolometer pixels 110 up to the overlying absorber platform 124. The provision of the plurality of support elements 130 allows the optical absorber structure 106 to be physically, and thus thermally, connected to each microbolometer pixel 110 of the microbolometer pixel unit 100. Each support element 130 thus provides a thermal conduction path for the heat generated by the optical absorber 128 upon absorption of terahertz radiation 122 to reach the thermistor 116 of its corresponding microbolometer pixel 110 and generate an electrical response indicative of the amount of absorbed terahertz radiation 122. In FIGS. 1 to 4, each support element 130 includes a pillar projecting upwardly from a central region of the thermistor platform 112 of its corresponding microbolometer pixel 110 to the absorber platform 124. However, each support element 130 may have various sizes, shapes, and arrangements, and may include any number of sub-elements (e.g., two or more pillars). In particular, each support element 130 may be connected to the thermistor platform 112 of its corresponding microbolometer pixel 110 at locations closer to its center, at locations closer to its periphery, or both.

It is appreciated that the thermal conductances of the absorber platform 124 and of the absorber support member 126 can be adjusted based on the thermal requirements or preferences of a given application. For example, in some embodiments, the thermal conductance of each support element 130 of the absorber support member 126 is larger (e.g., significantly larger, such as ten times larger or more) than the thermal conductance of the thermistor support member 114 of the corresponding microbolometer pixel 110 to ensure or help ensure a uniform heat distribution among the microbolometer pixels 110 of the microbolometer pixel unit 100. In such embodiments, the microbolometer pixels 110 will tend to exhibit identical or nearly identical pixel responses, and the microbolometer pixel unit 100 can be treated as a single larger effective pixel. The larger effective pixel size provided by the microbolometer pixel unit 100 can increase the sensitivity to the longer wavelengths of terahertz radiation compared to infrared radiation.

The optical absorber 128 may be embodied by any suitable material, structure, or device configured for absorption of terahertz radiation. In some embodiments, the optical absorber 128 may include or be part of a multilayer structure formed of one or more electrically conductive layers (e.g., made of metal and/or semiconductor materials) and one or more electrically insulating layers (e.g., made of dielectric materials) whose structure, configuration, and material composition are selected to favor absorption of terahertz radiation. The selection of the materials forming the optical absorber 128 can be made to control the spectral response of the microbolometer pixel unit 100 and/or to ensure compatibility with thin-film deposition and processing techniques.

Figures 5, 6, 7:
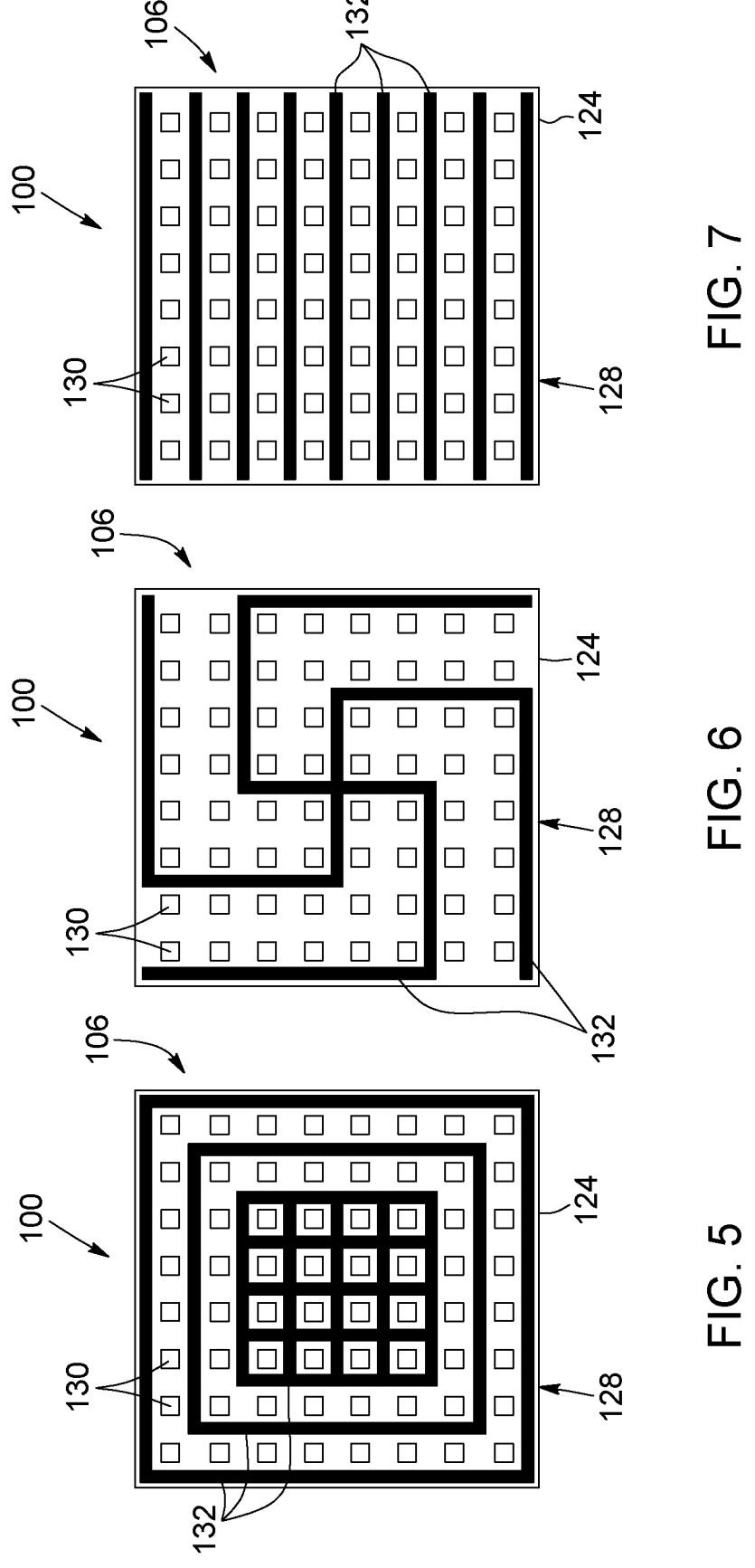
FIG. 5 is a schematic top view of a microbolometer pixel unit, in accordance with another embodiment.
FIG. 6 is a schematic top view of a microbolometer pixel unit, in accordance with another embodiment.
FIG. 7 is a schematic top view of a microbolometer pixel unit, in accordance with another embodiment.
Figure 8:
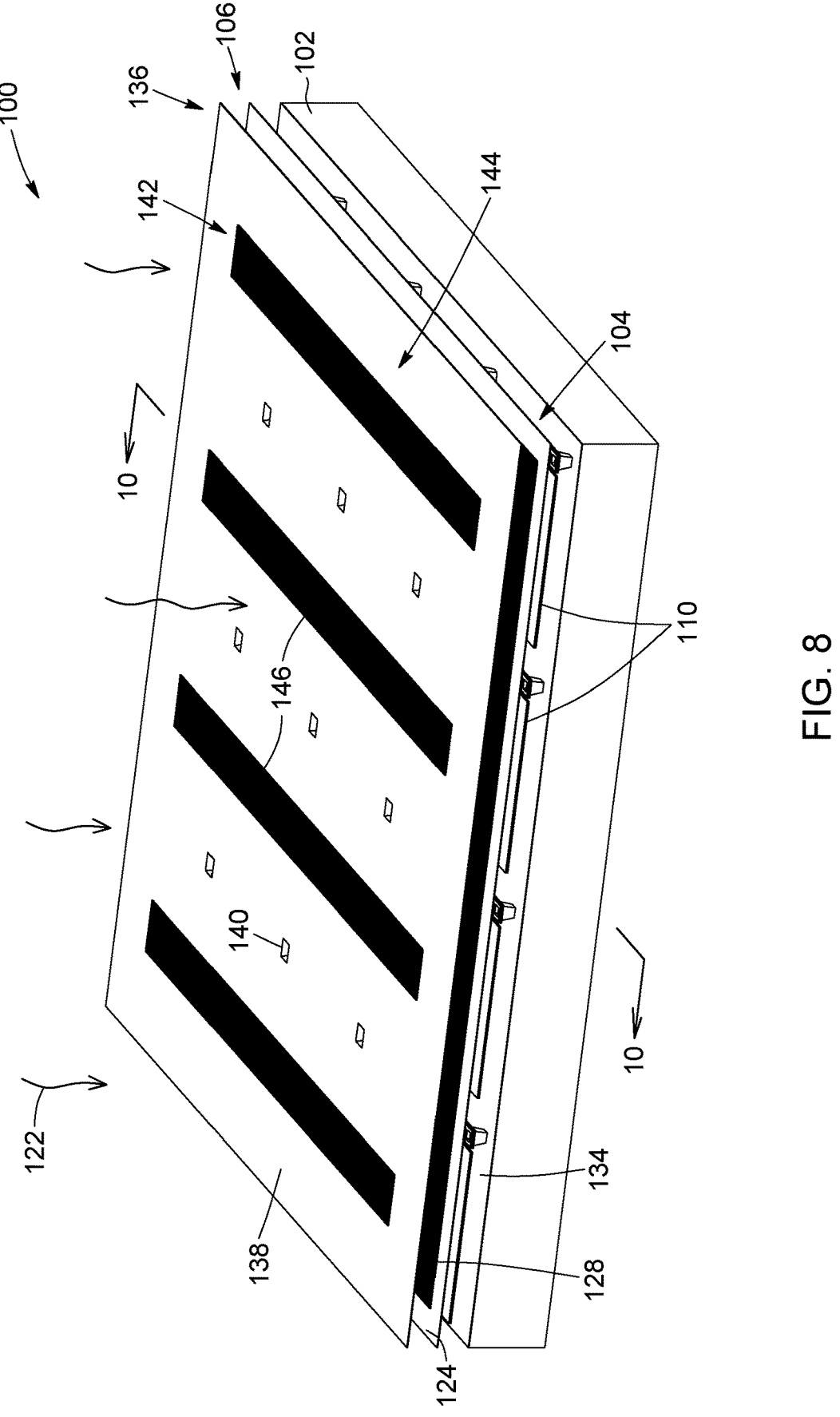
FIG. 8 is a schematic perspective view of a microbolometer pixel unit, in accordance with another embodiment.
Figure 9:
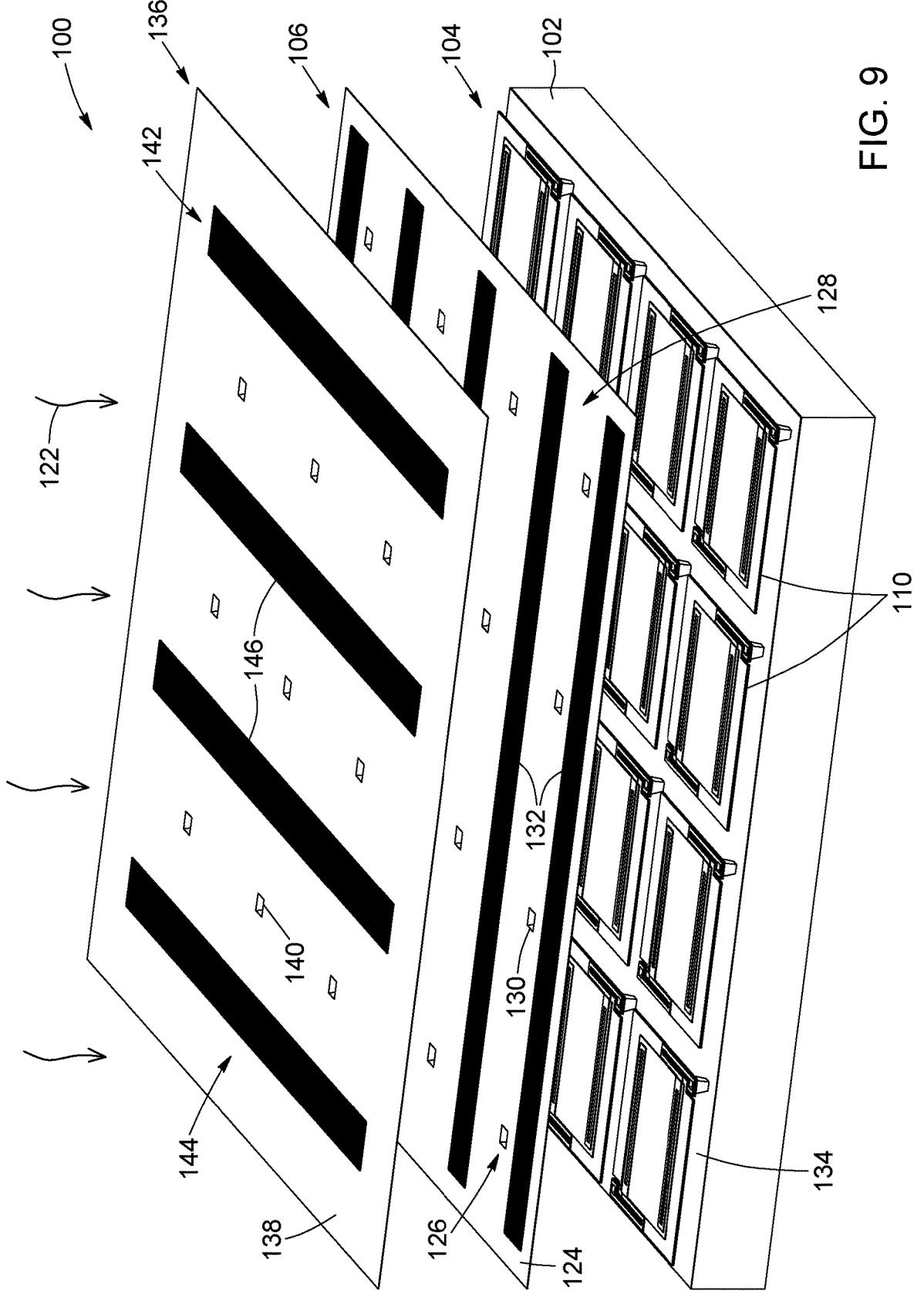
FIG. 9 is a partially exploded view of the microbolometer pixel unit of FIG. 8.
Figure 10:
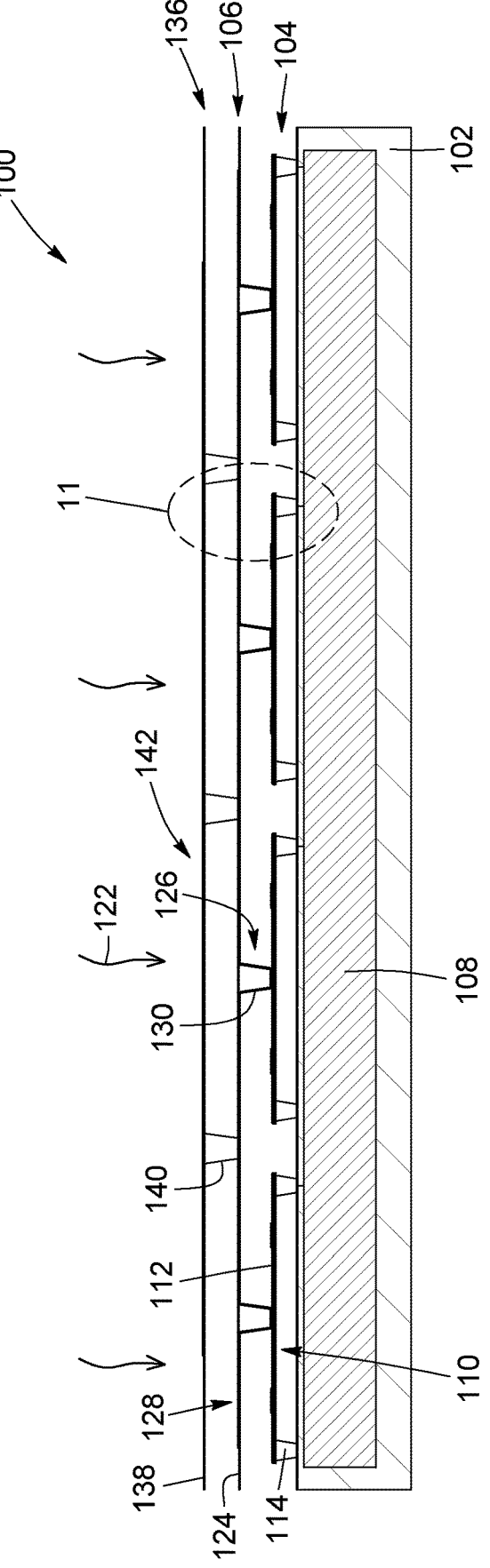
FIG. 10 is a cross-sectional view of the microbolometer pixel unit of FIG. 8, taken along section line 10-10.
Figure 11:
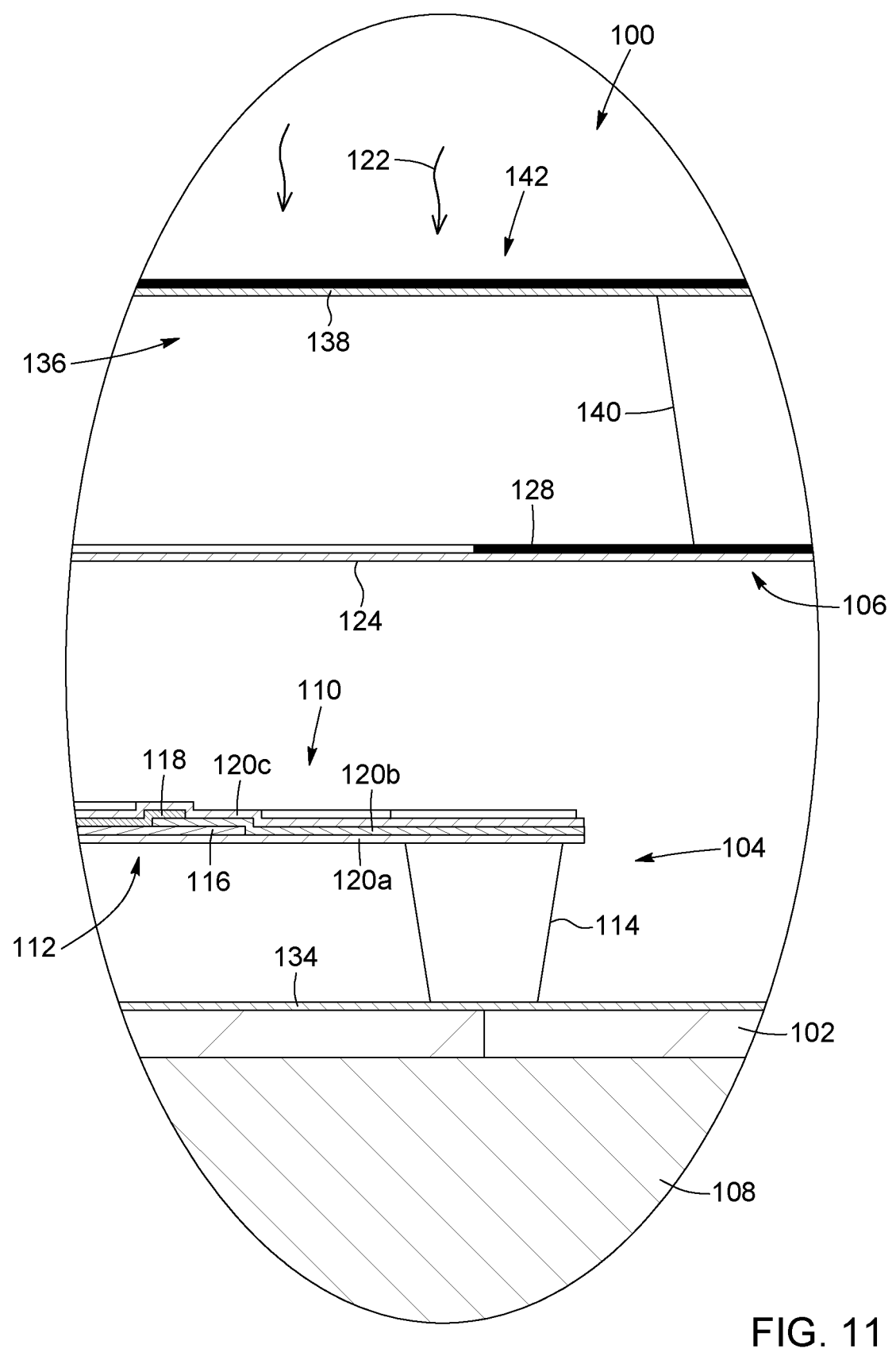
FIG. 11 is an enlarged view of portion 11 of FIG. 10.
Figure 12:
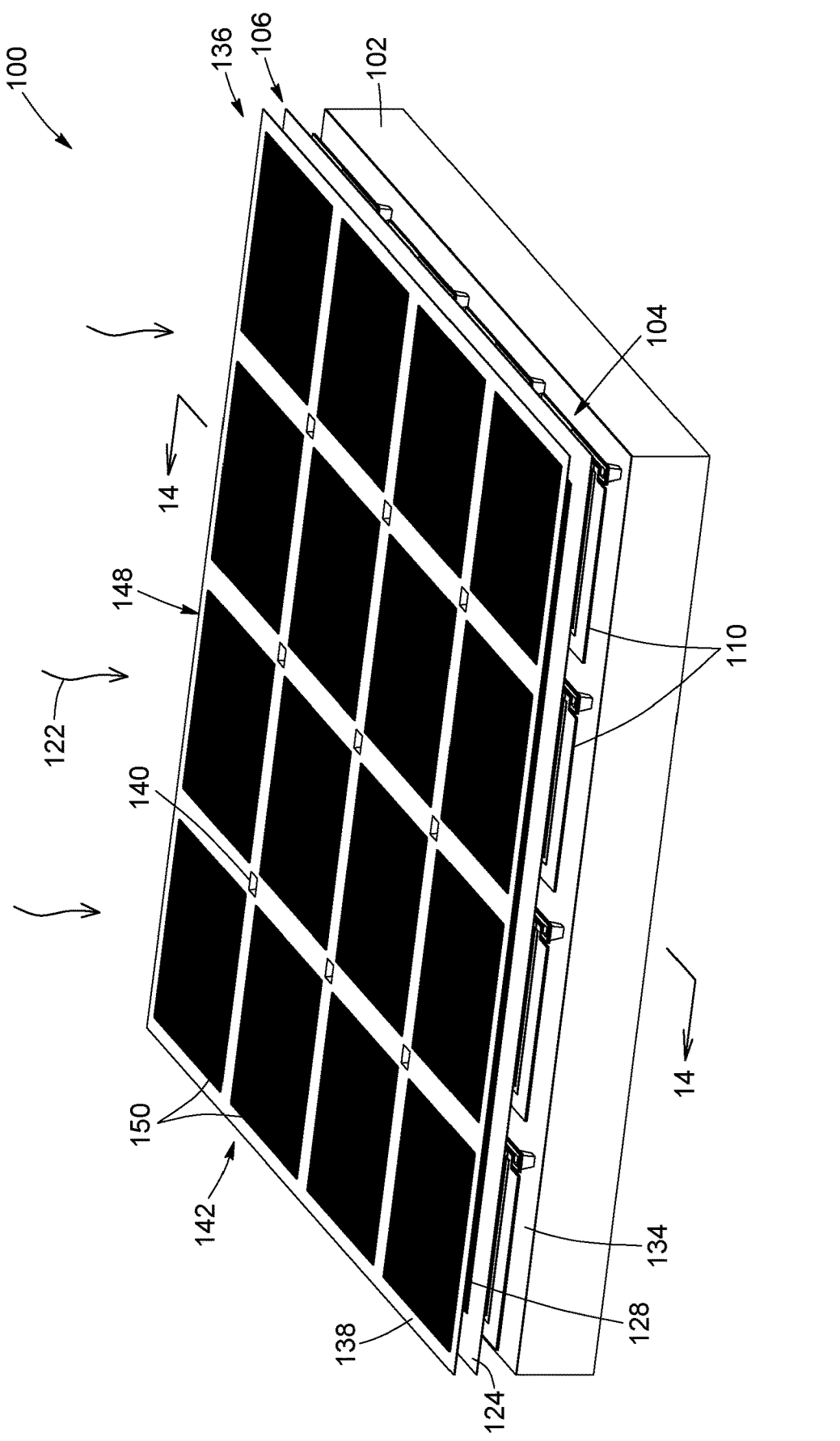
FIG. 12 is a schematic perspective view of a microbolometer pixel unit, in accordance with another embodiment.
Figure 13:
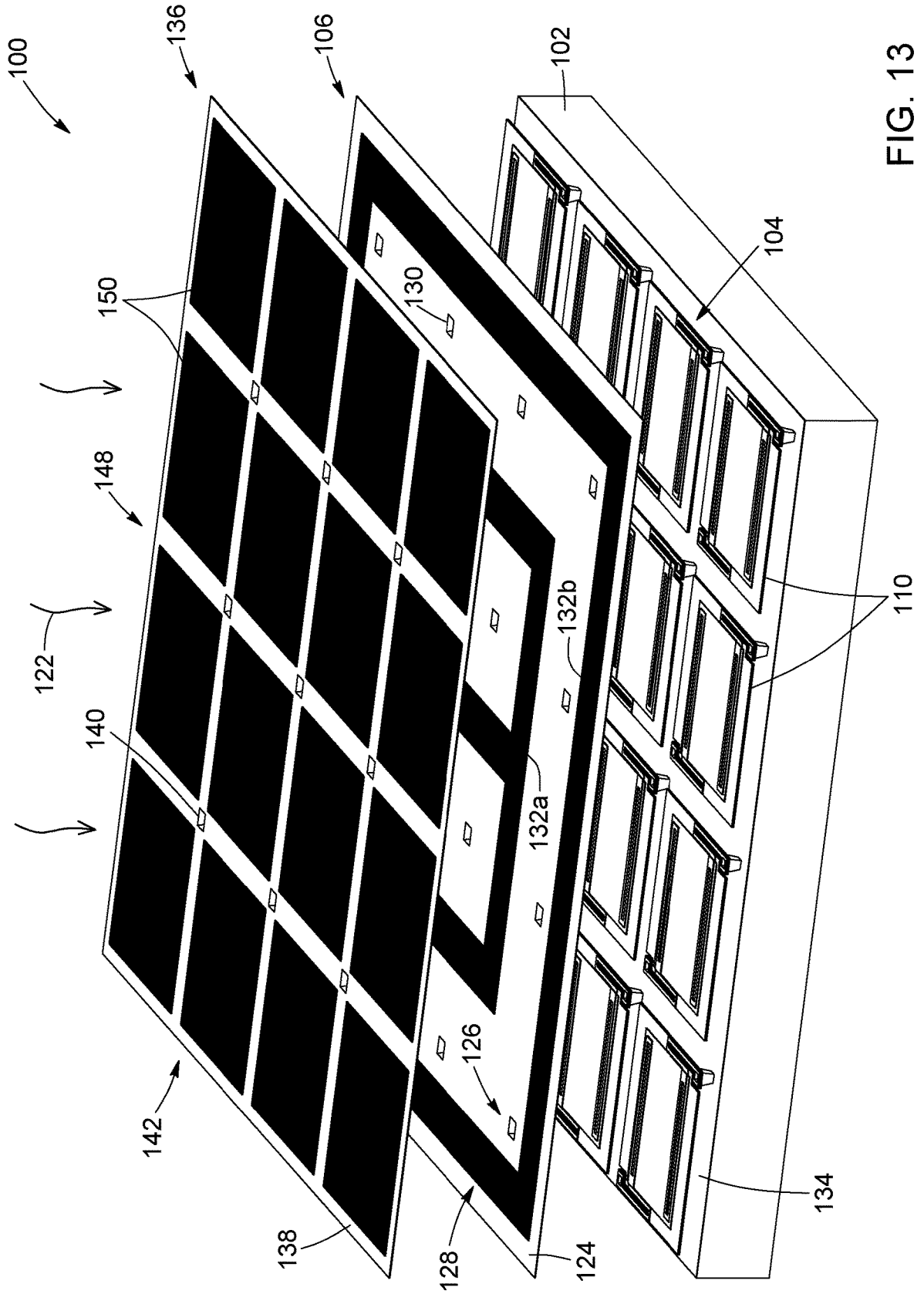
FIG. 13 is a partially exploded view of the microbolometer pixel unit of FIG. 12.
Figure 14:
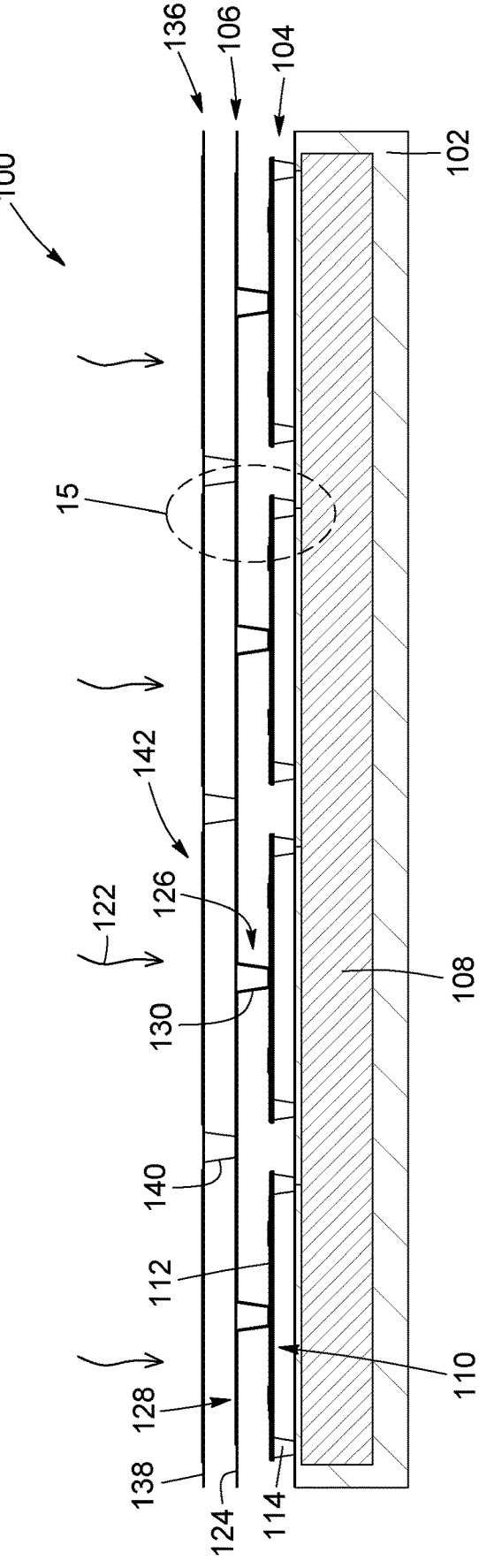
FIG. 14 is a cross-sectional view of the microbolometer pixel unit of FIG. 12, taken along section line 14-14.
Figure 15:
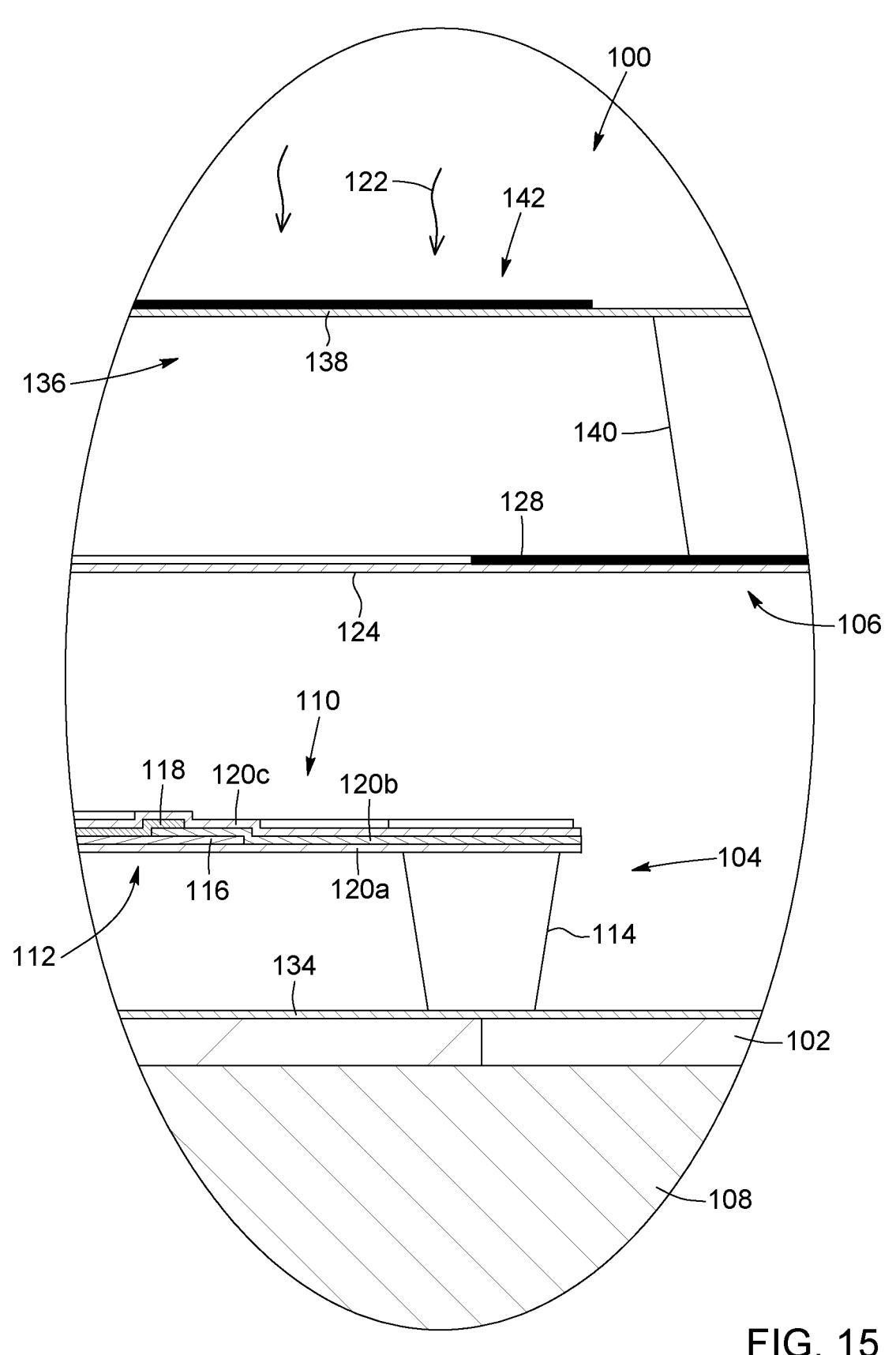
FIG. 15 is an enlarged view of portion 15 of FIG. 14.

In some embodiments, the optical absorber 128 may be patterned in order to tailor the spectral response of the microbolometer pixel unit 100. Depending on the application, the pattern defined by the optical absorber 128 may correspond to any regular or irregular arrangement of absorber elements including, but not limited to, lines, squares, circles, grids, crosses, and any other suitable shapes or combinations of shapes. For example, in the embodiment of FIGS. 1 to 4, the optical absorber 128 includes an electrically conductive layer patterned on the absorber platform 124 to form an arrangement of a plurality of absorber elements 132a, 132b. The arrangement includes an inner absorber element 132a, made of an electrically conducting material and shaped as a square grid, and an outer absorber element 132b, made of an electrically conducting material and shaped as a square frame enclosing the inner absorber element 132a. However, other embodiments can use various other configurations for the plurality of absorber elements 132 of the optical absorber 128. Non-limiting examples are depicted in the embodiments of FIGS. 5, 6, and 7. It is noted that the microbolometer pixel unit 100 depicted in each of these three embodiments includes sixty-four microbolometer pixels (not shown; see the sixty-four corresponding support elements 130) disposed in an 8×8 array under a single optical absorber structure 106.

It is appreciated that various characteristics of the optical absorber structure 106, for example, the material properties (e.g., electrical conductivity, refractive index, extinction coefficient) and the geometry (e.g., length, width, thickness, shape, and arrangement) of the optical absorber 128, or the height of the absorber platform 124 above the thermistor structure 104, can be determined so as to provide the microbolometer pixel unit 100 with a target spectral response. In some embodiments, the optical absorber structure 106 can be designed to provide broadband absorption over a relatively large spectral range, while in other embodiments, the optical absorber structure 106 can be designed to provide narrowband absorption in one or a few specific spectral bands.

In some embodiments, the optical absorber structure 106 may include a reflector 134 disposed on the substrate 102, under the thermistor platforms 112 of the microbolometer pixels 110. In such embodiments, the optical absorber 128 and the reflector 134 may together form an optical resonant cavity configured to enhance absorption of terahertz radiation 122. The reflector 134 may be embodied by a metal layer, for example, a thin film of aluminum, gold, or silver, configured to provide a terahertz reflecting surface. The reflector 134 can provide additional absorption by reflecting back toward the optical absorber 128 the part of the terahertz radiation that has not been absorbed on its first passage through the optical absorber 128.

In some embodiments, the optical absorber structure 106 can be configured to provide the microbolometer pixel unit 100 with a polarization-selective spectral response. For example, the optical absorber 128 may be configured to absorb more strongly a first component of the incoming terahertz radiation 122 having a first polarization state than a second component of the incoming terahertz radiation 122 having a second polarization state orthogonal to the first polarization state. This is the case for the microbolometer pixel unit 100 illustrated FIG. 7, where the optical absorber 128 includes a plurality of elongated absorber elements 132 disposed parallel to one another on the absorber platform 124. In this embodiment, the optical absorber 128 is configured, within a certain spectral band, to absorb radiation polarized parallel to the elongated absorber elements 132 more strongly than radiation polarized perpendicular to the elongated absorber elements 132.

Referring to FIGS. 8 to 11, there are illustrated schematic views of another possible embodiment of a microbolometer pixel unit 100, which generally includes a substrate 102, a thermistor structure 104, and an optical absorber structure 106. The embodiment of FIGS. 8 to 11 can share several features with the embodiments of FIGS. 1 to 7 described above, which need not be described again other than to highlight differences between them.

In the embodiment of FIGS. 8 to 11, the microbolometer pixel unit 100 includes a radiation conditioning structure 136 that generally includes a conditioner platform 138 suspended above the optical absorber structure 106, a conditioner support member 140 configured to hold the conditioner platform 138, and a radiation conditioner 142 disposed on the conditioner platform 138 and configured to spectrally condition the incoming terahertz radiation 122 that reaches the optical absorber structure 106.

The conditioner platform 138 and the conditioner support member 140 may be made of a low-stress and self-supporting material, such as silicon nitride, silicon dioxide, silicon oxynitride, or a metal oxide, and may be provided in a variety of sizes, shapes, and configurations, which may be the same as or different from those of the underlying absorber platform 124 and absorber support member 126. In some embodiments, the conditioner support member 140 may be configured to suspend the conditioner platform 138 at a height ranging from about 2 μm to about 10 μm above the absorber platform 124 of the underlying optical absorber structure 106, although other height values are possible in other embodiments. In the embodiment of FIGS. 8 to 11, the conditioner support member 140 includes a plurality of support elements, and each support element extends from a location on the absorber platform 124 that is centrally disposed with respect to the locations where four corresponding support elements 130 of the absorber support member 128 connect to the absorber platform 124. However, various other configurations are possible in other embodiments.

The radiation conditioner 142 is configured to modify the spectral content of the incoming terahertz radiation 122 that reaches the optical absorber 128. Depending on the application, the radiation conditioner 142 may operate by absorption, reflection, or scattering of the incoming terahertz radiation 122 in one or more spectral bands.

In the embodiment of FIGS. 8 to 11, the radiation conditioner 142 includes an additional optical absorber 144 made of a plurality of additional absorbing elements 146 patterned on the conditioner platform 138, wherein the additional optical absorber 144 has an absorption spectrum in the terahertz region that is different from that of the optical absorber 128 disposed on the absorber platform 124. In this way, the additional optical absorber 144 is configured to supplement the optical absorber 128 to define the overall spectral response of the microbolometer pixel unit 100. For example, in some embodiments, the absorption spectrum of the optical absorber 128 may have a first absorption peak or band within a first spectral range and the absorption spectrum of the additional optical absorber 144 may have a second absorption peak or band within a second spectral range different from the first spectral range. In other embodiments, the optical absorber 128 and the additional optical absorber 144 may be configured to have different sensitivities to the state of polarization of the radiation incident thereon. For example, in the embodiment of FIGS. 8 to 11, the optical absorber 128 includes a first set of elongated absorber elements 132 disposed parallel to one another on the absorber platform 124 along a first direction, and the additional optical absorber 144 includes a second set of elongated absorber elements 146 disposed parallel to one another on the conditioner platform 138 along a second direction orthogonal to the first direction. In such an embodiment, the optical absorber 128 may be configured to selectively absorb components of the incoming terahertz radiation 122 polarized along the first direction, while the additional optical absorber 144 may be configured to selectively absorb components of the incoming terahertz radiation 122 polarized along the second direction. It is appreciated that, in general, the resulting absorption spectrum of the microbolometer pixel unit 100 is not a linear superposition of the individual absorption spectra of the optical absorber 128 and the additional optical absorber 144.

It is appreciated that while the embodiment of FIGS. 8 to 11 includes a single additional optical absorber 144, other embodiments may include multiple additional optical absorbers disposed in a vertically stacked and spaced-apart arrangement by multiple corresponding additional platforms and support members.

Referring to FIGS. 12 to 15, there are illustrated schematic views of another possible embodiment of a microbolometer pixel unit 100, which generally includes a substrate 102, a thermistor structure 104, an optical absorber structure 106, and a radiation conditioning structure 136. The embodiment of FIGS. 12 to 15 can share several features with the embodiments of FIGS. 1 to 11 described above, which need not be described again other than to highlight differences between them.

In the embodiment of FIGS. 12 to 15, the radiation conditioner 142 of the radiation conditioning structure 136 includes a spectral filter 148 configured to filter out unwanted spectral components from the incoming terahertz radiation 122 prior to the incoming terahertz radiation 122 reaching the optical absorber 128. Depending on the application, the spectral filter 148 may be a low-pass filter, a high-pass filter, a bandpass filter, a bandstop filter, or a combination thereof. In the embodiment of FIGS. 12 to 15, the spectral filter 148 includes an array of square patches 150 configured to operate as a low-pass filter having a cutoff frequency determined by the geometry and composition of the square patches 150. In some embodiments, the spectral filter 148 may be configured to reflect unwanted high-frequency radiation (e.g., infrared radiation) so as to prevent unwanted high-frequency radiation from reaching the optical absorber 128 and possibly degrading the optical performance of the microbolometer pixel unit 100.

It is appreciated that in some embodiments, the microbolometer pixel unit 100 may include multiple radiation conditioning structures vertically stacked one on top of the other. For example, the multiple radiation conditioning structures may include a first radiation conditioning structure whose radiation conditioner includes an additional optical absorber, such as the one depicted in the embodiments FIGS. 8 to 11, and a second radiation conditioning structure whose radiation conditioner includes a spectral filter, such as the one depicted in FIGS. 12 to 15.

Figure 16:
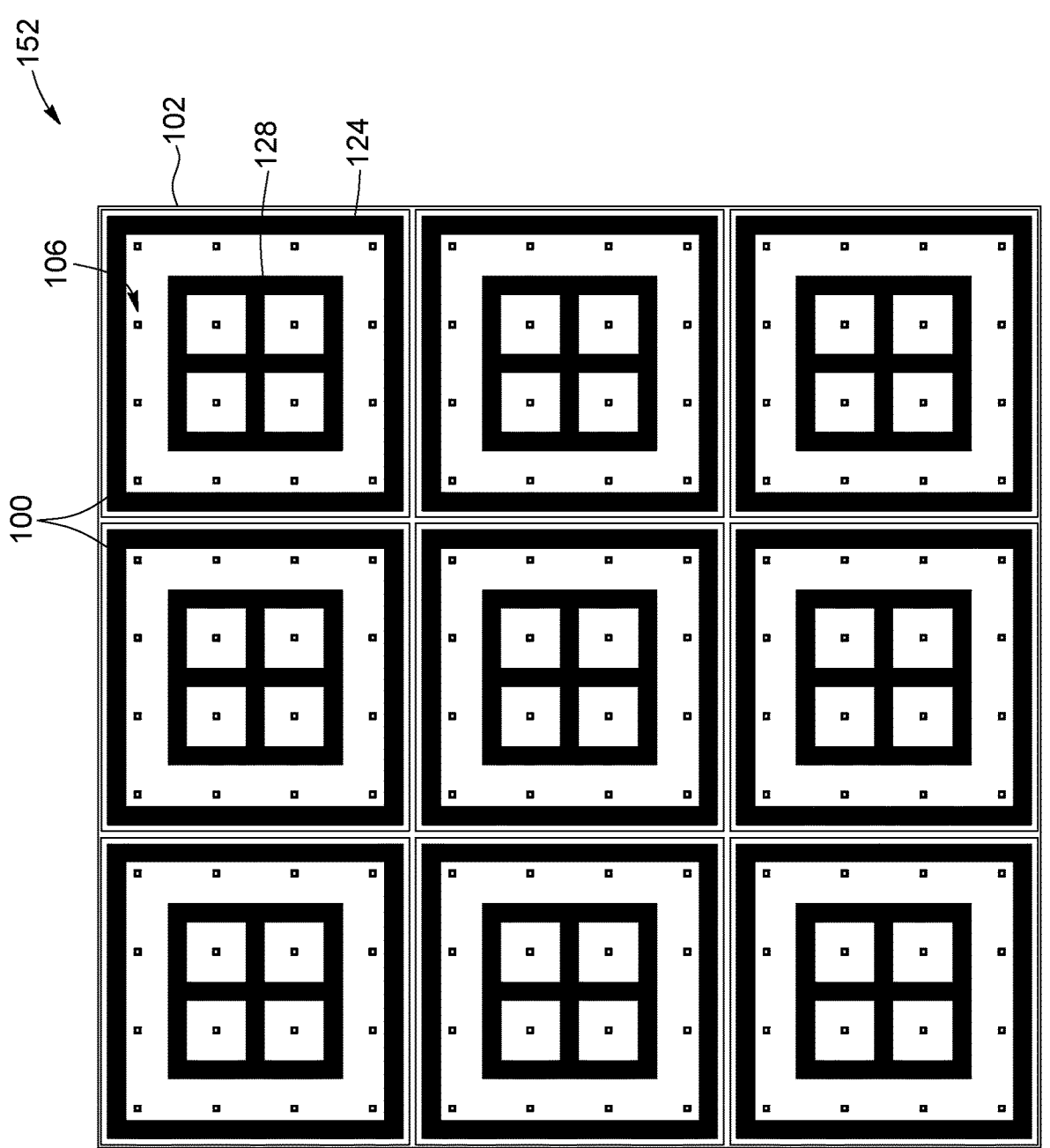
FIG. 16 is a schematic perspective view of a microbolometer array including a plurality of microbolometer pixel units, in accordance with an embodiment.
Figure 17:
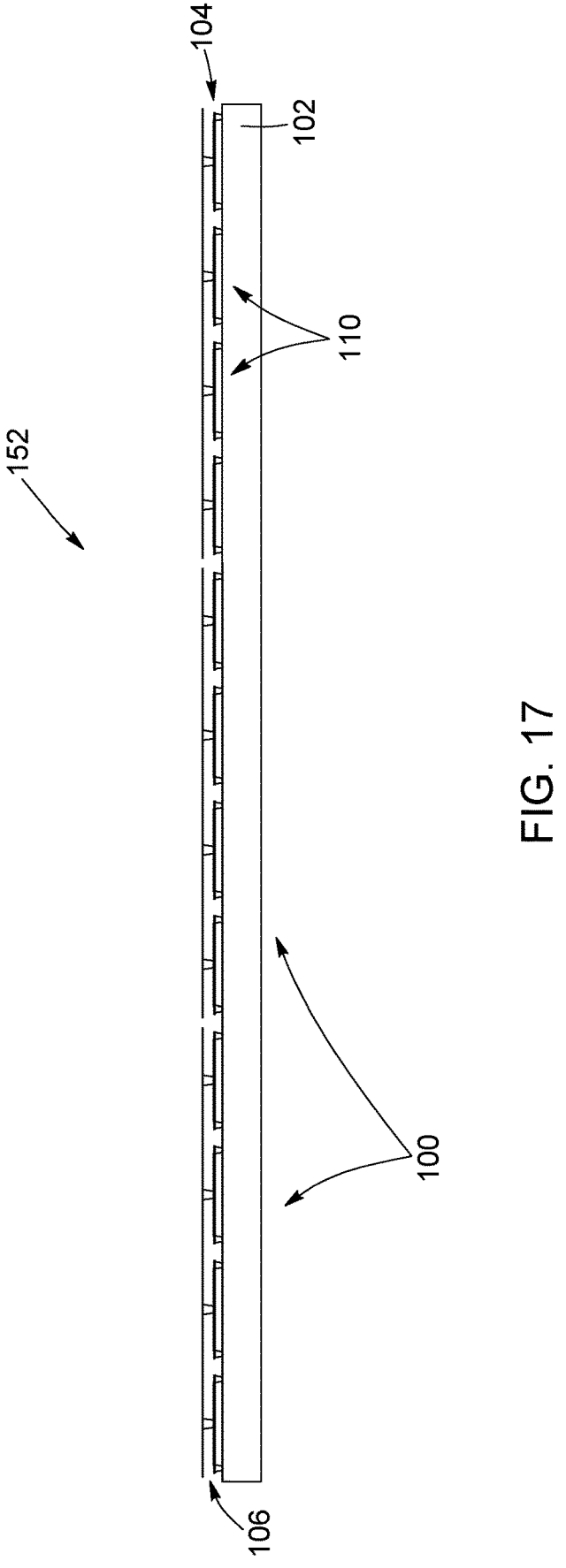
FIG. 17 is a front elevation view of the microbolometer array of FIG. 16.

Referring to FIGS. 16 and 17, there are illustrated schematic views of a microbolometer array 152. The microbolometer array 152 includes a plurality of microbolometer pixel units 100, which are arranged in a two-dimensional matrix of rows and columns. The microbolometer pixel units 100 can be similar to those described above and illustrated in FIGS. 1 to 15. The microbolometer array 152 may be integrated into a terahertz camera or any other imaging device configured for detection of terahertz radiation. FIG. 16 depicts the microbolometer array 152 as including only nine microbolometer pixel units 100 for clarity, where each microbolometer pixel unit 100 is depicted as including sixteen microbolometer pixels 110, for a total of 144 microbolometer pixels. However, in practice, the number of a microbolometer pixel units 100 in the array 152 will generally be larger. For example, in some embodiments, the microbolometer array 152 may include from about 128×96 to about 1024×768 microbolometer pixel units 100, with a pixel pitch ranging from about 20 μm to about 320 μm. Depending on the application, the microbolometer pixel units 100 may be arranged into a regular linear or two-dimensional array, or be provided at arbitrary locations that do not conform to any specific pattern. Furthermore, the microbolometer pixel units 100, and in particular their absorption spectra, may or may not be all identical.

It is appreciated that the overall spectral response of the microbolometer array 152 represents a combination of the plurality of spectral responses of the plurality of microbolometer pixel units 100. Thus, the spectral response of the microbolometer array 152 can be tailored from the spectral responses of the individual pixel units 100 during fabrication or design. In some embodiments, the microbolometer pixel units 100 can be designed to operate as single pixels of larger pixel size, which reduces the number of effective pixels of the microbolometer array 152 but can allow terahertz radiation 122 to be detected with improved sensitivity and reduced noise. For example, in the embodiment of FIGS. 16 and 17, the number of effective pixels in the microbolometer array 152 would be 9 (corresponding to the number of microbolometer pixel units 100) rather than 144 (corresponding to the total number of microbolometer pixels 110).

In some embodiments, the spectra responses of the pixel units 100 can be designed so as to provide the array 152 with a continuous or nearly continuous broadband absorption spectrum over a certain terahertz waveband. In other embodiments, the spectral responses of the pixel units 100 can be designed so as to provide the array 152 with an absorption spectrum having a single or multiple absorption peaks in the terahertz region. In yet other embodiments, the spectral responses of the pixel units 100 can be designed so as to provide the array 152 with a polarization-sensitive absorption spectrum. It is appreciated that the spectral response of each microbolometer pixel unit 100 of the array 152 can be individually tailored according to various design rules to provide the array 152 with an overall absorption spectrum having specific wavelength and/or polarization sensitivities.

Numerous modifications could be made to the embodiments described above without departing from the scope of the appended claims.

The invention claimed is:

1. A microbolometer pixel unit for detection of terahertz radiation, comprising:
    a substrate;
    a thermistor structure comprising a plurality of microbolometer pixels disposed on the substrate, each microbolometer pixel comprising:
        a thermistor platform suspended above the substrate;
        a thermistor support member holding the thermistor platform; and
        a thermistor disposed on the thermistor platform and having an electrical resistance that varies in accordance with a temperature of the thermistor; and
    an optical absorber structure comprising:
        an absorber platform extending continuously and suspended above the thermistor structure;
        an absorber support member holding the absorber platform and comprising a plurality of support elements, each support element providing a thermal conduction path extending from the thermistor platform of a respective one of the microbolometer pixels to the absorber platform; and
        an optical absorber disposed on the absorber platform and configured to absorb incoming terahertz radiation to generate heat to change the temperature of the thermistors of the microbolometer pixels.

2. The microbolometer pixel unit of claim 1, wherein the plurality of microbolometer pixels is arranged in an M×N array under the optical absorber structure, wherein M and N each range from 2 to 32.

3. The microbolometer pixel unit of claim 1, wherein the thermistor platform of each microbolometer pixel has horizontal dimensions ranging from about 10 μm to about 50 μm.

4. The microbolometer pixel unit of claim 1, wherein the absorber platform has horizontal dimensions ranging from about 20 μm to about 320 μm.

5. The microbolometer pixel unit of claim 1, wherein the absorber platform has a square shape.

6. The microbolometer pixel unit of claim 1, wherein the thermistor of each microbolometer pixel is made of a thermistor material comprising vanadium oxide or amorphous silicon.

7. The microbolometer pixel unit of claim 1, wherein each support element of the absorber support member is coupled to a central region of the thermistor platform of the respective one of the microbolometer pixels.

8. The microbolometer pixel unit of claim 1, wherein each support element of the absorber support member has a thermal conductance that is larger than a thermal conductance of the thermistor support member of the respective one of the microbolometer pixels.

9. The microbolometer pixel unit of claim 1, wherein the optical absorber is configured to absorb the incoming terahertz radiation in a waveband ranging from about 30 micrometers to about 3000 micrometers.

10. The microbolometer pixel unit of claim 1, wherein the optical absorber comprises an electrically conductive layer patterned on the absorber platform to form an arrangement of a plurality of absorber elements.

11. The microbolometer pixel unit of claim 1, wherein the optical absorber is configured to absorb a first component of the incoming terahertz radiation having a first polarization state more strongly than a second component of the incoming terahertz radiation having a second polarization state orthogonal to the first polarization state.

12. The microbolometer pixel unit of claim 1, further comprising a reflector disposed on the substrate and configured to form an optical resonant cavity with the optical absorber for enhancing absorption of the incoming terahertz radiation by the optical absorber.

13. The microbolometer pixel unit of claim 1, further comprising a radiation conditioner structure comprising:
    a conditioner platform suspended above the optical absorber structure;
    a conditioner support member holding the conditioner platform; and
    a radiation conditioner disposed on the conditioner platform and configured to spectrally condition the incoming terahertz radiation.

14. The microbolometer pixel unit of claim 13, wherein the radiation conditioner comprises an additional optical absorber configured to supplement the optical absorber disposed on the absorber platform.

15. The microbolometer pixel unit of claim 14, wherein the optical absorber and the additional optical absorber are configured to have different sensitivities to a state of polarization of the incoming terahertz radiation.

16. The microbolometer pixel unit of claim 13, wherein the radiation conditioner comprises a spectral filter configured to filter out unwanted spectral components from the incoming terahertz radiation.

17. The microbolometer pixel unit of claim 16, wherein the spectral filter is a low-pass filter.

18. A microbolometer array comprising a plurality of microbolometer pixel units in accordance with claim 1.

19. The microbolometer array of claim 18, wherein a number of the microbolometer pixel units ranges from about 64×48 to about 1024×768.

* * * * *